US008923878B2

(12) United States Patent
Morimoto et al.

(10) Patent No.: US 8,923,878 B2
(45) Date of Patent: Dec. 30, 2014

(54) MOBILE STATION, RADIO BASE STATION, AND MOBILE COMMUNICATION METHOD

(75) Inventors: Akihito Morimoto, Yokohama (JP); Yoshihisa Kishiyama, Yokosuka (JP); Motohiro Tanno, Yokohama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 113 days.

(21) Appl. No.: 13/120,333

(22) PCT Filed: Sep. 18, 2009

(86) PCT No.: PCT/JP2009/066433
§ 371 (c)(1),
(2), (4) Date: May 24, 2011

(87) PCT Pub. No.: WO2010/032847
PCT Pub. Date: Mar. 25, 2010

(65) Prior Publication Data
US 2011/0217983 A1    Sep. 8, 2011

(30) Foreign Application Priority Data

Sep. 22, 2008  (JP) ................................ P2008-242648

(51) Int. Cl.
| *H04W 72/00* | (2009.01) |
| *H04W 16/14* | (2009.01) |
| *H04W 24/10* | (2009.01) |
| *H04W 36/18* | (2009.01) |
| *H04W 48/16* | (2009.01) |
| *H04W 72/08* | (2009.01) |

(52) U.S. Cl.
CPC .............. *H04W 16/14* (2013.01); *H04W 24/10* (2013.01); *H04W 36/18* (2013.01); *H04W 48/16* (2013.01); *H04W 72/082* (2013.01)
USPC ........ 455/452.2; 455/434; 455/436; 455/442; 455/453; 370/331; 370/332; 370/333

(58) Field of Classification Search
CPC ............ H04W 24/10; H04W 28/0231; H04W 28/0236; H04W 28/0247; H04W 28/0268; H04W 28/044; H04W 28/18; H04W 36/00; H04W 36/18

USPC ............................. 455/432.1–453, 522, 63.1, 455/115.3–115.4; 370/328–334, 395.4, 447
See application file for complete search history.

(56) References Cited

U.S. PATENT DOCUMENTS

| 7,315,523 | B2 * | 1/2008 | Cai et al. ........................ 370/312 |
| 8,023,897 | B2 * | 9/2011 | Cho et al. ...................... 455/63.1 |
| 8,184,578 | B2 * | 5/2012 | Kazmi et al. .................. 370/329 |
| 8,542,655 | B2 * | 9/2013 | Kuroda et al. ................ 370/332 |
| 2002/0022480 | A1 * | 2/2002 | Jensen .......................... 455/423 |

(Continued)

FOREIGN PATENT DOCUMENTS

| CN | 1360446 A | 7/2002 |
| CN | 1440151 A | 9/2003 |

(Continued)

OTHER PUBLICATIONS

3GPP TR 25.814 V7.1.0, Sep. 2006, Physical layer aspects for evolved Universal Terrestrial Radio Access (UTRA), 132 pages.

(Continued)

*Primary Examiner* — Dai A Phuong
(74) *Attorney, Agent, or Firm* — Osha Liang LLP

(57) ABSTRACT

A mobile station, where the mobile station includes a reception quality measurement unit, a channel quality information transmission unit, and a control signal transmission unit, where the reception quality measurement unit is configured to measure a reception quality of a pilot signal of each of a plurality of cells, when a radio link is established with the plurality of cells, where the channel quality information transmission unit is configured to transmit, to a first cell having the beset reception quality among the plurality of cells, channel quality information corresponding to the reception quality, and where the control signal transmission unit is configured to transmit, to a cell other than the first cell among the plurality of cells, a control signal requesting not to transmit a data signal by using the same resource as the first cell.

4 Claims, 3 Drawing Sheets

(56) References Cited

U.S. PATENT DOCUMENTS

| | | | |
|---|---|---|---|
| 2002/0082021 A1 | 6/2002 | Chen et al. | |
| 2003/0153272 A1* | 8/2003 | Takano | 455/67.1 |
| 2004/0204907 A1* | 10/2004 | Gutowski | 702/182 |
| 2008/0008147 A1 | 1/2008 | Nakayama | |
| 2009/0022173 A1* | 1/2009 | Horn et al. | 370/460 |
| 2009/0124261 A1* | 5/2009 | Shimomura | 455/436 |
| 2009/0247084 A1* | 10/2009 | Palanki | 455/63.1 |
| 2012/0094711 A1* | 4/2012 | Lee et al. | 455/525 |

FOREIGN PATENT DOCUMENTS

| | | |
|---|---|---|
| JP | 2002-199459 A | 7/2002 |
| JP | 2002-232941 A | 8/2002 |
| JP | 2008-017325 A | 1/2008 |
| JP | 2008-288932 A | 11/2008 |
| WO | 2008/007437 A1 | 1/2008 |

OTHER PUBLICATIONS

International Search Report issued in PCT/JP2009/066433, mailed on Oct. 20, 2009, with translation, 5 pages.

Written Opinion issued in PCT/JP2009/066433, mailed on Oct. 20, 2009, 4 pages.

Notice of Grounds for Rejection for Japanese Patent Application No. 2008-242648 mailed May 8, 2012, with English translation thereof (5 pages).

Patent Abstract for Japanese Publication No. 2008-288932 published Nov. 27, 2008 (1 page).

Office Action for Japanese Patent Application No. 2008-242648 mailed Aug. 7, 2012, with English translation thereof (5 pages).

Patent Abstract for Japanese Publication No. 2008-017325 published Jan. 24, 2008 (1 page).

Office Action for Chinese application No. 200980137091.0 dated Apr. 3, 2013, with English translation thereof (9 pages).

Chinese Office Action issued in Chinese Patent Application No. 200980137091.0, mailing date Dec. 2, 2013, with English translation thereof (9 pages).

Office Action in corresponding Chinese application No. 200980137091.0, mailed Jul. 16, 2014 (10 pages).

* cited by examiner

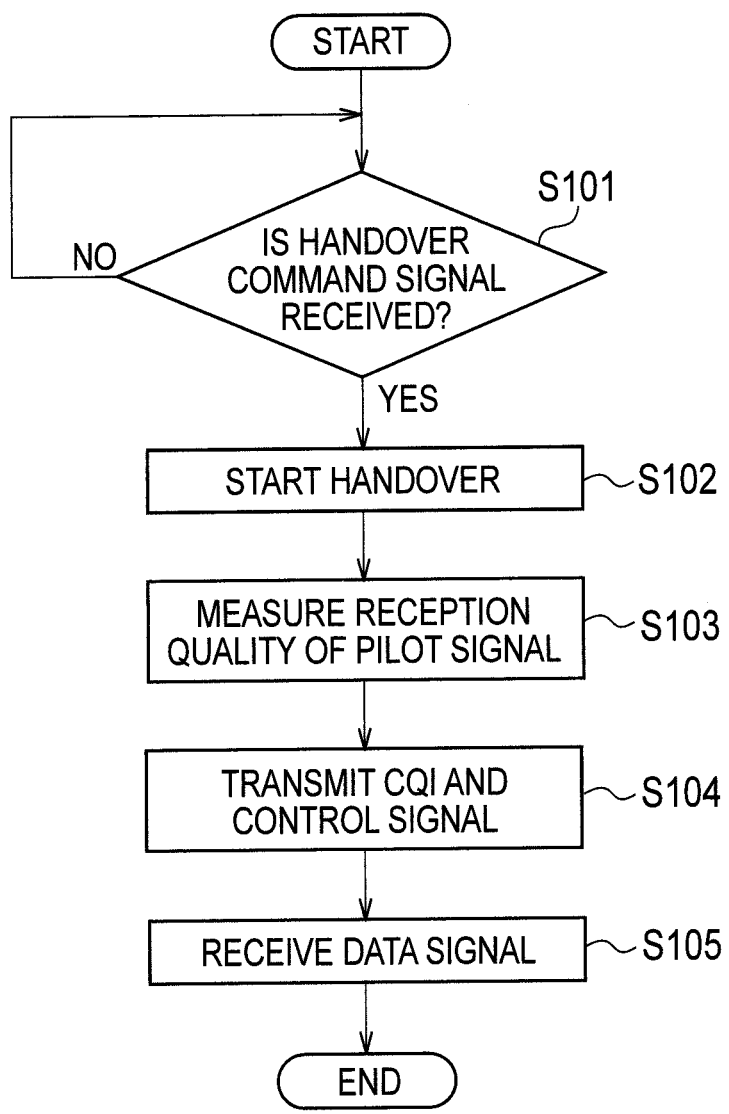

MOBILE STATION, RADIO BASE STATION, AND MOBILE COMMUNICATION METHOD

TECHNICAL FIELD

The present invention relates to a mobile station, a radio base station, and a mobile communication method.

BACKGROUND ART

In a mobile communication system of the LTE (Long Term Evolution) scheme that is being standardized under the 3GPP, the configuration is such that the same frequency is repeatedly used in a plurality of cells.

SUMMARY OF THE INVENTION

Problems to be Solved by the Invention

However, in such a mobile communication system configured so that the same frequency is repeatedly used in the plurality of cells, there is a problem that interference between the adjacent cells (inter-cell interference) may be generated.

In particular, in a mobile communication system configured such that each radio base station eNB determines a frequency to be used in a cell under the control of the each radio base station eNB, in an autonomously distributed manner, such a problem becomes significant.

Therefore, the present invention is intended to overcome the above-described problem. An object of the present invention is to provide a mobile station, a radio base station, and a mobile communication method, capable of reducing an inter-cell interference in a mobile communication system configured such that the same frequency is repeatedly used in a plurality of cells.

Means for Solving the Problem

A first aspect of the present invention is summarized as a mobile communication system in which the same frequency is configured to be repeatedly used in a plurality of cells, wherein, a mobile station includes: a reception quality measurement unit configured to measure, when a radio link is established with two or more cells, a reception quality of a pilot signal of each of the two or more cells; a channel quality information transmission unit configured to transmit, to a first cell having the best reception quality among the two or more of cells, channel quality information corresponding to the reception quality; and a control signal transmission unit configured to transmit, a cell other than the first cell among the two or more cells, a control signal requesting not to transmit a data signal by using the same resource as the first cell; a radio base station that manages the cell other than the first cell comprises: a scheduling unit configured to perform scheduling in a downlink; and the scheduling unit of the radio base station that manages the cell other than the first cell is configured to perform scheduling not to transmit the data signal by using the same resource as the first cell in the cell other than the first cell, when the control signal is received from the mobile station.

In the first aspect of the present invention, each of the plurality of radio base stations included in the mobile communication system can be configured to determine a frequency used in a cell under the control of each of the plurality of radio base stations, in an autonomously distributed manner.

A second aspect of the present invention is summarized as a mobile station including: a reception quality measurement unit configured to measure a reception quality of a pilot signal of each of a plurality of cells, when a radio link is established with the plurality of cells; a channel quality information transmission unit configured to transmit, to a first cell having the best reception quality among the plurality of cells, channel quality information corresponding to the reception quality; and a control signal transmission unit configured to transmit, to cell other than the first cell among the plurality of cells, a control signal requesting not to transmit a data signal by using the same resource as the first cell.

A third aspect of the present invention is summarized as a radio base station including a scheduling unit configured to perform scheduling in a downlink, wherein the scheduling unit is configured to perform scheduling, in a second cell under the control of the radio base station, not to transmit a data signal by using the same resource as the first cell included in a plurality of cells, when a predetermined control signal is received from a mobile station that establishes a radio link with the plurality of cells including the second cell.

In the third aspect of the present invention, the scheduling unit can be configured to preferentially assign a resource in the downlink, to the mobile station that establishes a radio link with the plurality of cells.

A fourth aspect of the present invention is summarized as a mobile communication method, including the steps of: measuring, at a mobile station, a reception quality of a pilot signal of each of a plurality of cells, when a radio link is established with the plurality of cells; transmitting, from the mobile station to a first cell having the best reception quality among the plurality of cells, channel quality information corresponding to the reception quality; transmitting, from the mobile station to a cell other than the first cell among the plurality of cells, a control signal requesting not to transmit a data signal by using the same resource as the first cell; and performing scheduling not to transmit the data signal by using the same resource as the first cell in the cell other than the first cell, when the control signal is received from the mobile station.

Effect of the Invention

As explained above, according to the present invention, it is possible to provide a mobile station, a radio base station, and a mobile communication method, capable of reducing an inter-cell interference in a mobile communication system configured such that the same frequency is repeatedly used in a plurality of cells.

BRIEF DESCRIPTION OF THE DRAWINGS

FIG. 5 is a flowchart illustrating an operation of the mobile station according to the first embodiment of the present invention.

BEST MODES FOR CARRYING OUT THE INVENTION (Configuration of Mobile Communication System According to First Embodiment of the Present Invention)

With reference to FIG. 1 to FIG. 4, the configuration of a mobile communication system according to a first embodiment of the present invention will be explained.

Figure 1:
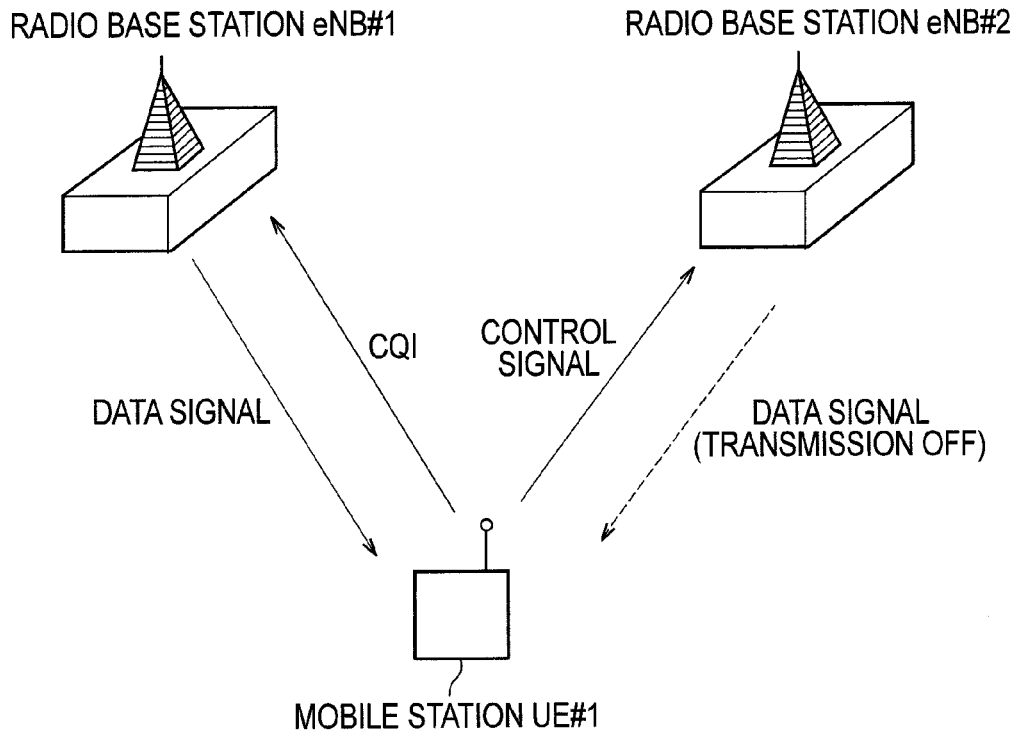
FIG. 1 is a diagram showing the entire configuration of a mobile communication system according to a first embodiment of the present invention.

As illustrated in FIG. 1, in the mobile communication system according to this embodiment, the LTE scheme is adopted. A plurality of radio base stations eNB are configured to control a mobile communication at each mobile station UE (for example, a mobile station UE#1) in an autonomously distributed manner, by exchanging a control signal with each other via a Backhaul line.

The present invention can be adaptable not only to the mobile communication system in which the LTE scheme is adopted but also to a mobile communication system in which communication systems other than the LTE scheme are adopted.

Figure 2:
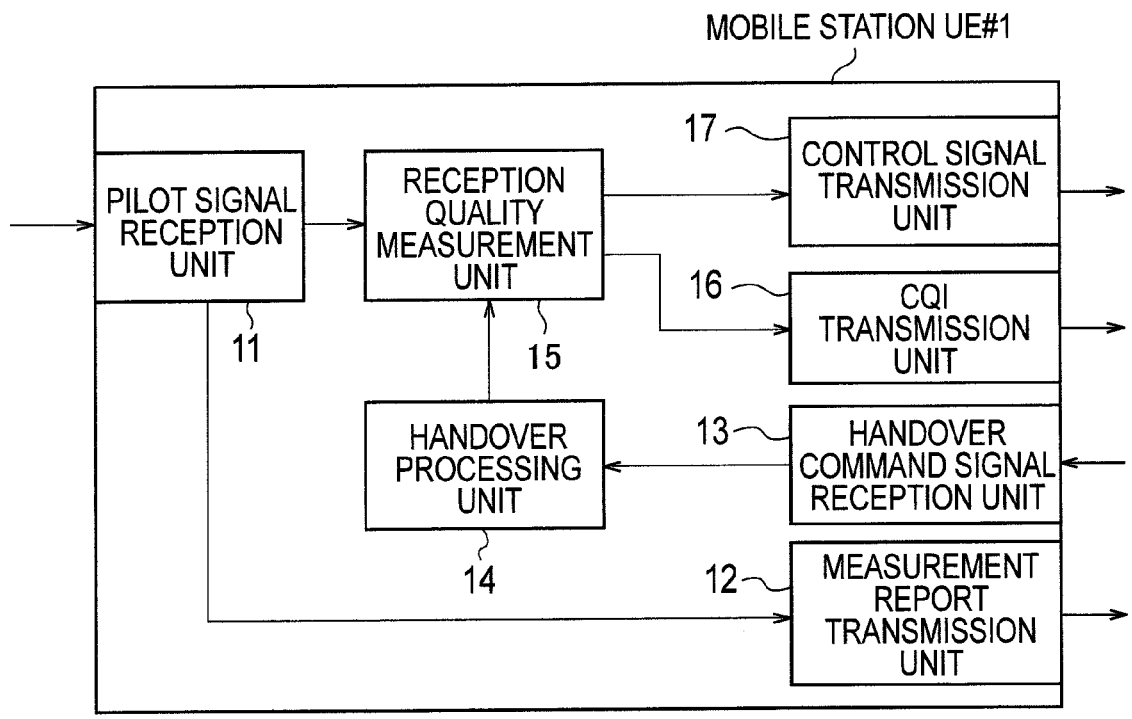
FIG. 2 is a functional block diagram of a mobile station according to the first embodiment of the present invention.

As illustrated in FIG. 2, a mobile station UE#1 (hereinafter, UE) according to this embodiment includes: a pilot signal reception unit 11; a measurement report transmission unit 12; a handover command signal reception unit 13; a handover processing unit 14; a reception quality measurement unit 15; a CQI transmission unit 16; and a control signal transmission unit 17.

The pilot signal reception unit 11 is configured to receive a pilot signal (RS: Reference Signal) transmitted by one or a plurality of cells in which a radio link (specifically, an RRC connection) is established by the mobile station UE.

The pilot signal reception unit 11 is configured to receive a pilot signal of a cell that is a measurement object designated by a radio access network apparatus (specifically, a radio base station eNB).

The measurement report transmission unit 12 is configured to measure a reception quality of the pilot signal received by the pilot signal reception unit 11, based on a reporting criteria designated by the radio access network apparatus (specifically, the radio base station eNB), and to transmit a measurement report intended to notify such measurement result.

Herein, the reception quality measured by the measurement report transmission unit 12 may include an RSRQ (Reference Signal Received Quality), an RSRP (Reference Signal Received Power), and a reception SIR (Signal to Interference Ratio).

The handover command signal reception unit 13 is configured to receive a handover command signal to command a start of handover, from the radio access network apparatus (specifically, the radio base station eNB).

The handover processing unit 14 is configured to perform a handover process, based on the handover command signal received by the handover command signal reception unit 13.

The reception quality measurement unit 15 is configured to measure the reception quality of the pilot signal transmitted by each of the plurality of cells, when the radio link is established with the plurality of cells by the mobile station UE, i.e., when the mobile station UE is in a soft handover state.

In this case, the reception quality measured by the reception quality measurement unit 15 may include RSRQ, RSRP, reception SIR, etc., similarly to the reception quality measured by the measurement report transmission unit 12.

The CQI transmission unit 16 is configured to transmit, to a first cell having the best reception quality measured by the reception quality measurement unit 15 among the plurality of cells to which the radio link is established by the mobile station UE, a CQI (Channel Quality Indicator) corresponding to the best reception quality.

The control signal transmission unit 17 is configured to transmit, to a cell other than the first cell having the best reception quality measured by the reception quality measurement unit 15 among the plurality of cells to which the radio link is established by the mobile station UE, a control signal requesting not to transmit a data signal by using the same resource (for example, a resource block) as the first cell.

For example, when the radio link is established with the two cells by the mobile station UE, the CQI transmission unit 16 is configured to transmit, to the first cell having a better reception quality, the CQI corresponding to the better reception quality, and the control signal transmission unit 17 is configured to transmit, to a second cell having a poorer reception quality, the above-described control signal.

The control signal transmission unit 17 may be configured to transmit the above-described control signal, only when the reception quality in a cell other than the first cell falls below a predetermined threshold value.

Figure 3:
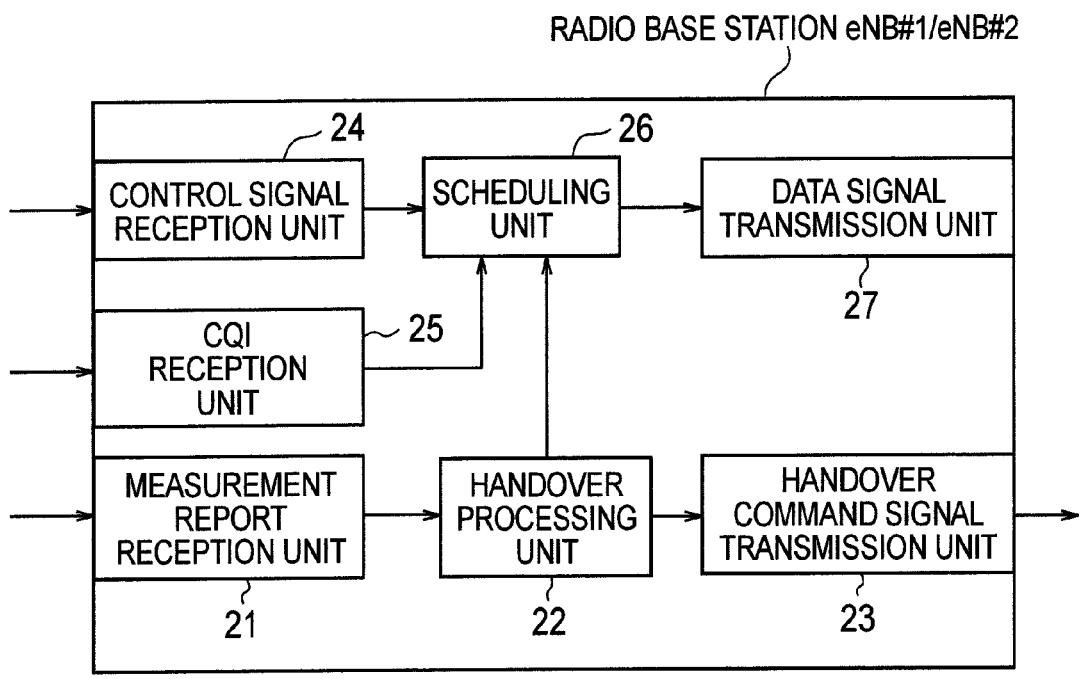
FIG. 3 is a functional block diagram of a radio base station according to the first embodiment of the present invention.

As illustrated in FIG. 3, a radio base station eNB#1/eNB#2 (hereinafter, eNB) according to this embodiment includes: a measurement report reception unit 21; a handover processing unit 22; a handover command signal transmission unit 23; a control signal reception unit 24; a CQI reception unit 25; a scheduling unit 26; and a data signal transmission unit 27.

The measurement report reception unit 21 is configured to receive a measurement report transmitted by the mobile station UE in which the radio link is established with a cell under the control of the radio base station eNB.

The handover processing unit 22 is configured to determine whether or not the above-described mobile station UE should start a handover, based on the measurement report received by the measurement report reception unit 21.

The handover processing unit 22 may be configured to determine whether or not the above-described mobile station UE should start a handover, according to a "cell edge identifier" received from another radio base station.

In this case, the "cell edge identifier" is an identifier indicating that each mobile station UE is present at a cell edge, and is notified to a particular radio base station eNB from each mobile station UE. For example, when a difference in the reception quality of pilot signals of two cells remains within a predetermined threshold value, the mobile station UE may determine that the mobile station UE is present at a cell edge, and notify, to the radio base station eNB managing either one of the two cells, the "cell edge identifier" indicating that each mobile station UE is present at the cell edge.

The handover command signal transmission unit 23 is configured to transmit a handover command signal indicating that it is necessary to start a handover, to the mobile station UE that has been determined by the handover processing unit 22 that it is necessary to start a handover.

The control signal reception unit 24 is configured to receive the above-described control signal, from the mobile station UE in which the radio link is established with the cell under the control of the radio base station eNB.

The CQI reception unit 25 is configured to receive the above-described CQI, from the mobile station UE in which the radio link is established with the cell under the control of the radio base station eNB.

The scheduling unit 26 is configured to perform scheduling in a downlink.

Specifically, when the control signal reception unit 24 receives the above-described control signal from the mobile station UE in which the radio link is established with a plurality of cells including a second cell under the control of the radio base station eNB, the scheduling unit 26 is configured to perform scheduling, in the second cell, not to transmit a data signal by using the same resource as the first cell included in the plurality of cells.

Figure 4:
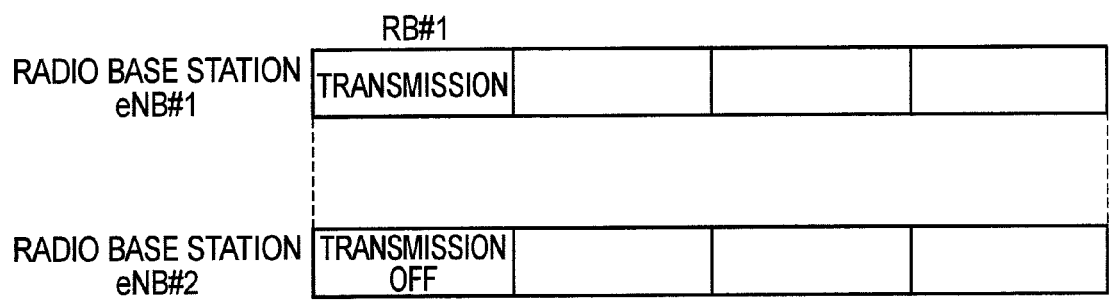
FIG. 4 is a diagram explaining a method of transmitting a data signal in the radio base station according to the first embodiment of the present invention.

For example, as illustrated in FIG. 4, when the control signal reception unit 24 receives a control signal requesting not to transmit the data signal by using the same resource block #1 as a cell #1 in a cell #2, from the mobile station UE that establishes the radio link with the cell #1 under the control of the radio base station eNB#1 and with the cell #2 under the control of the radio base station eNB#2, and when the CQI reception unit 25 receives the CQI relating to the cell #1, the scheduling unit 26 transmits the data signal to the cell #1, in the resource block #1, and stops transmitting the data signal to the cell #2.

The scheduling unit 26 is configured to preferentially assign the resource in the downlink to the mobile station UE that establishes the radio link with the plurality of cells, i.e., the mobile station UE in a soft handover state.

The data signal transmission unit 27 is configured to transmit the data signal to the mobile station UE, by using a resource in the downlink that is assigned by the scheduling unit 26 to the mobile station UE.

(Operation of the Mobile Communication System According to First Embodiment of the Present Invention)

With reference to FIG. 5, the operation of the mobile communication system according to the first embodiment of the present invention, specifically, the operation of the mobile station UE, will be explained.

As illustrated in FIG. 5, at step S101, when the mobile station UE that establishes the radio link with the first cell receives the handover command signal from the radio base station eNB managing the first cell, the operation proceeds to step S102.

At step S102, the mobile station UE starts the handover by establishing the radio link between the first cell and the second cell according to the handover command signal.

At step S103, the mobile station UE measures the reception quality of the pilot signals in the first cell and the second cell. In this case, it is assumed that the reception quality of the pilot signal in the second cell is better than that of the pilot signal in the first cell.

At step S104, the mobile station UE transmits the control signal requesting the second cell to transmit the CQI corresponding to the reception quality of the second cell, and requesting the first cell not to transmit the data signal by using the same resource as the second cell.

At step S105, the mobile station UE receives the data signal transmitted by the second cell. In such a case, it is assumed that the data signal is not transmitted from the first cell.

(Operation and Effect of the Mobile Communication System According to the First Embodiment of the Present Invention)

According to the embodiment-based mobile communication system, when the mobile station UE establishes the radio link with the plurality of cells, it is possible to stop the transmission of the data signal by the cell having the poorer reception quality of the pilot signal at the mobile station UE, and thus, it is possible to reduce an inter-cell interference in the mobile communication system configured such that the same frequency is repeatedly used in the plurality of cells.

Moreover, according to the embodiment-based mobile communication system, it is possible to preferentially assign the downlink to the mobile station UE present at the cell edge, i.e., the mobile station UE in a soft handover state, and stop the transmission of the data signal by the cell having the poorer reception quality of the pilot signal at the mobile station UE, and thus, it is possible to raise the throughput in the downlink.

The operation of the above-described mobile station UE or radio base station eNB may be implemented by a hardware, may also be implemented by a software module executed by a processor, and may further be implemented by the combination of the both.

The software module may be arranged in a storing medium of an arbitrary format such as RAM (Random Access Memory), a flash memory, ROM (Read Only Memory), EPROM (Erasable Programmable ROM), EEPROM (Electronically Erasable and Programmable ROM), a register, a hard disk, a removable disk, and CD-ROM.

Such a storing medium is connected to the processor so that the processor can write and read information into and from the storing medium. Such a storing medium may also be accumulated in the processor. Such a storing medium and processor may be arranged in ASIC. Such ASIC may be arranged in the mobile station UE and the radio base station eNB. As a discrete component, such a storing medium and processor may be arranged in the mobile station UE and the radio base station eNB.

Thus, the present invention has been explained in detail by using the above-described embodiments; however, it is obvious that for persons skilled in the art, the present invention is not limited to the embodiments explained herein. The present invention can be implemented as a corrected, modified mode without departing from the gist and the scope of the present invention defined by the claims. Therefore, the description of the specification is intended for explaining the example only and does not impose any limited meaning to the present invention.

The invention claimed is:

1. A mobile communication system in which the same frequency is configured to be repeatedly used in a plurality of cells, wherein,
    a mobile station comprises:
        a reception quality measurement unit configured to measure, when a radio link is established with two or more cells, a reception quality of a pilot signal of each of the two or more cells;
        a channel quality information transmission unit configured to transmit, to a first cell having the best reception quality among the two or more of cells, channel quality information corresponding to the reception quality; and
        a control signal transmission unit configured to transmit, to a cell other than the first cell among the two or more cells, a control signal requesting a second cell other than the first cell to transmit the channel quality information corresponding to the reception quality of the pilot signal of the second cell and requesting the first cell not to transmit a data signal by using the same resource as the second cell,
        wherein the control signal transmission unit is configured to transmit the control signal, only when the reception quality in the cell other than the first cell falls below a predetermined threshold value;
    a radio base station that manages the cell other than the first cell comprises:
        a scheduling unit configured to perform scheduling in a downlink; and
        the scheduling unit of the radio base station that manages the first cell is configured to perform scheduling not to transmit the data signal by using the same resource as the second cell, when the control signal is received from the mobile station.

2. The mobile communication system according to claim 1, wherein
    each of the plurality of radio base stations included in the mobile communication system is configured to determine a frequency used in a cell under the control of each of the plurality of radio base stations, in an autonomously distributed manner.

3. A mobile station comprising:
a reception quality measurement unit configured to measure a reception quality of a pilot signal of each of a plurality of cells, when a radio link is established with the plurality of cells;
a channel quality information transmission unit configured to transmit, to a first cell having the best reception quality among the plurality of cells, channel quality information corresponding to the reception quality; and
a control signal transmission unit configured to transmit, to a cell other than the first cell among the plurality of cells, a control signal requesting a second cell other than the first cell to transmit the channel quality information corresponding to the reception quality of the pilot signal of the second cell and requesting the first cell not to transmit a data signal by using the same resource as the second cell, wherein,
the control signal transmission unit is configured to transmit the control signal, only when the reception quality in the cell other than the first cell falls below a predetermined threshold value.

4. A mobile communication method, comprising the steps of:
measuring, at a mobile station, a reception quality of a pilot signal of each of a plurality of cells, when a radio link is established with the plurality of cells;
transmitting, from the mobile station to a first cell having the best reception quality among the plurality of cells, channel quality information corresponding to the reception quality;
transmitting, from the mobile station to a cell other than the first cell among the plurality of cells, a control signal requesting a second cell other than the first cell to transmit the channel quality information corresponding to the reception quality of the pilot signal of the second cell and requesting the first cell not to transmit a data signal by using the same resource as the second cell, wherein the mobile station transmits the control signal only when the reception quality in the cell other than the first cell falls below a predetermined threshold value; and
performing scheduling not to transmit the data signal by using the same resource as the second cell, when the control signal is received from the mobile station.

* * * * *